United States Patent [19]

Pollack et al.

[11] Patent Number: 4,708,178

[45] Date of Patent: * Nov. 24, 1987

[54] FLUID COUPLING SYSTEM

[75] Inventors: Jack Pollack, Reseda; Richard F. Pabers, Canoga Park, both of Calif.

[73] Assignee: Amtel, Inc., Providence, R.I.

[ * ] Notice: The portion of the term of this patent subsequent to Oct. 13, 2004 has been disclaimed.

[21] Appl. No.: 864,798

[22] Filed: May 19, 1986

Related U.S. Application Data

[63] Continuation-in-part of Ser. No. 747,411, Jun. 21, 1985.

[51] Int. Cl.$^4$ .............................................. B65B 3/04
[52] U.S. Cl. .................................... 141/279; 141/387
[58] Field of Search ....................................... 141/1–12, 141/279, 387, 388, 389

[56] References Cited

U.S. PATENT DOCUMENTS

| | | | |
|---|---|---|---|
| 1,697,020 | 1/1929 | Priebe et al. | 61/69 R |
| 3,252,528 | 5/1966 | Nicolson | 166/352 |
| 3,311,063 | 3/1967 | Grable | 166/359 |
| 3,641,602 | 2/1972 | Flory et al. | 9/8 P |
| 3,840,927 | 10/1974 | Reid | 141/388 |
| 3,851,492 | 12/1974 | Cannon et al. | 61/69 R |
| 4,026,119 | 5/1977 | Dotti | 61/95 |
| 4,067,202 | 1/1978 | Reed | 61/86 |
| 4,088,089 | 5/1978 | Flory | 114/230 |
| 4,262,620 | 4/1981 | Nooteboom | 114/230 |
| 4,317,474 | 3/1982 | Kentosh | 141/387 |
| 4,423,983 | 1/1984 | Dadiras et al. | 405/195 |
| 4,459,930 | 7/1984 | Flory | 141/387 |
| 4,501,525 | 2/1985 | Grundy et al. | 141/388 |

Primary Examiner—Houston S. Bell, Jr.
Attorney, Agent, or Firm—Freilich, Hornbaker, Rosen & Fernandez

[57] ABSTRACT

An improved hose structure is provided for passing fluid across a pivot joint, that permits a transfer structure to pivot about two horizontal axes with respect to a vessel or the like at the sea surface. A middle conduit has a lower end connected to a pipe on the transfer structure and an upper end connected to a pipe on the vessel. The middle conduit can pivot, either by being flexible to bend along its length, or by being rigid but with flexible joints at its opposite ends. The pipe on the vessel can move up and down and is biased upwardly. When the transfer structure tilts, to raise or lower the lower end of the hose, the upper end can also rise or fall.

9 Claims, 7 Drawing Figures

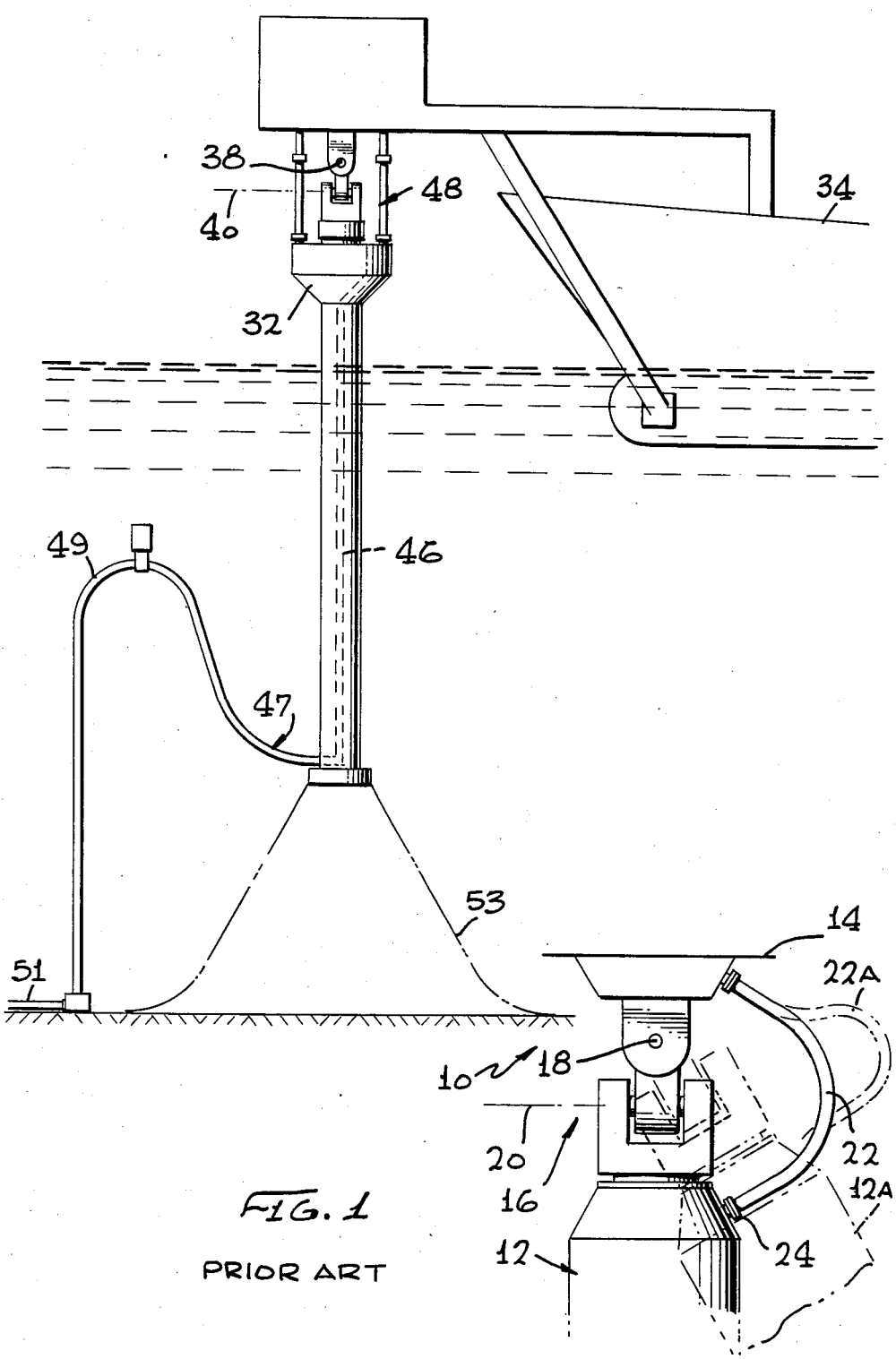

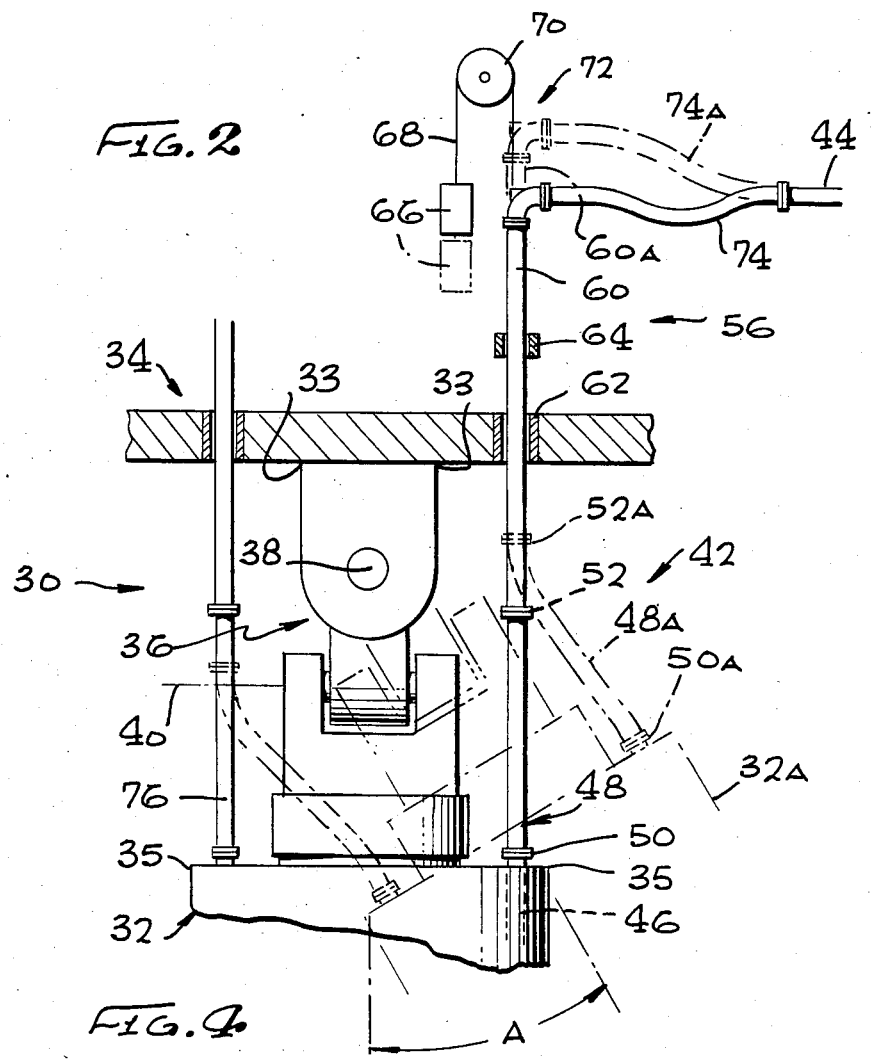

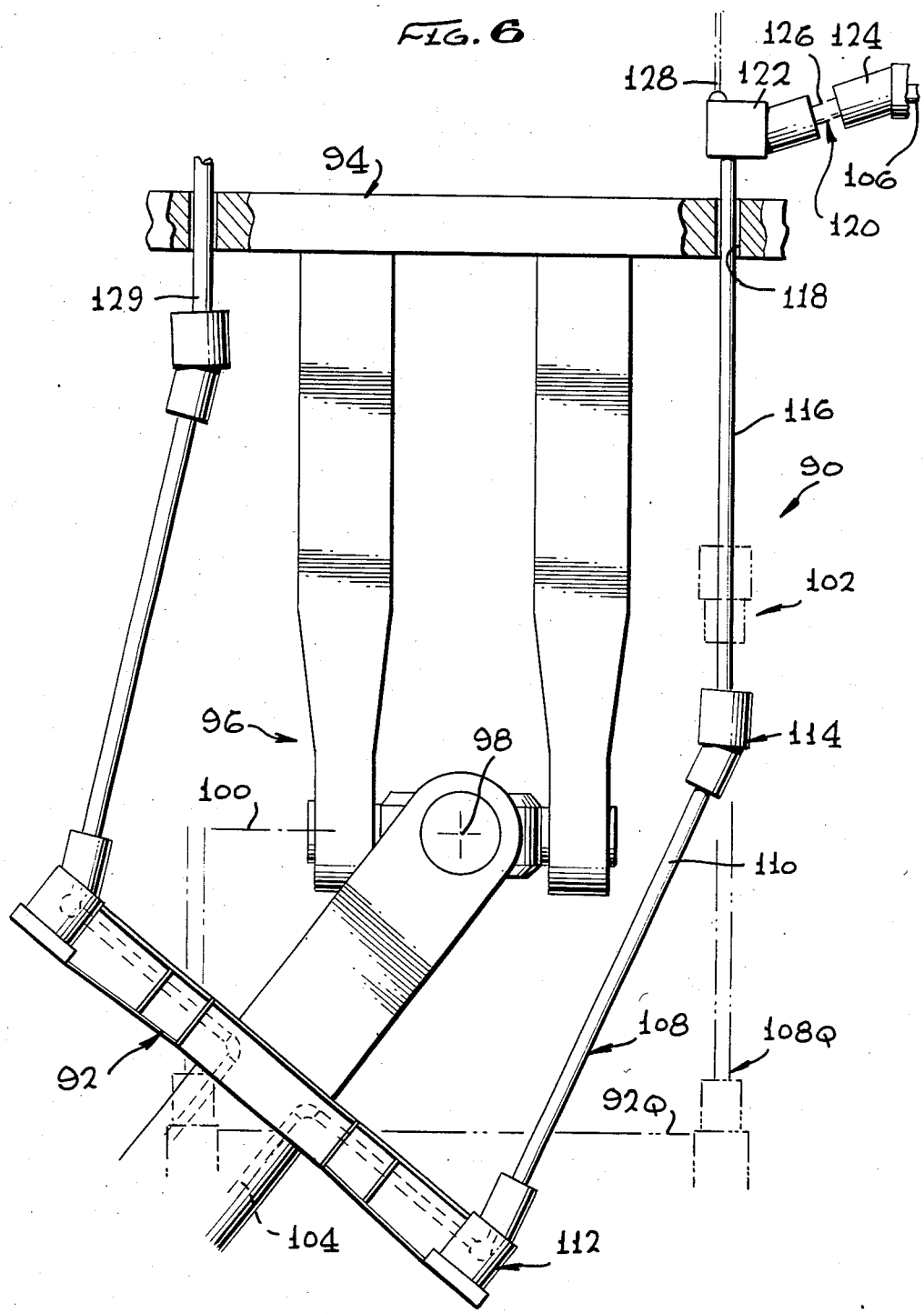

FLUID COUPLING SYSTEM

CROSS REFERENCE TO RELATED PATENT

This is a continuation-in-part of U.S. patent application Ser. No. 747,411, filed 6/21/85.

BACKGROUND OF THE INVENTION

An offshore terminal often includes a transfer structure such as a column whose lower end is anchored to the sea floor and whose upper end is coupled to a vessel or the like at the sea surface through a main pivot joint. The pivot joint permits the transfer structure to pivot about horizontal axes with respect to the vessel. A pipe extending along the transfer structure has a lower end coupled to a pipe at the sea floor which may be connected to hydrocarbon wells or a shore installation. The upper end of the pipe on the transfer structure can be connected to a conduit on the vessel through a flexible conduit such as a hose or flexible pipe that carries fluid across the main pivot joint. As the transfer structure pivots with respect to the vessel, the ends of the flexible conduit are moved together and apart, and the flexible conduit must extend in a loose loop to accommodate such movement. Such flexible conduits extending in loops can be cumbersome, especially where many of such conduits are required, since the loops of conduits lie in a wide area and must be protected from damage. The flexible conduits can be subjected to a considerable range of bending that reduces their life, especially where they carry high flows which result in considerable loading tending to bend them further. A fluid coupling structure which avoided wide looped hoses for passing across a pivot joint, would be of considerable value.

SUMMARY OF THE INVENTION

In accordance with one embodiment of the present invention, a flexible conduit arrangement is provided for transferring fluid across the space occupied by a main pivot joint. At least one end of the flexible conduit can move up and down as the pivot joint pivots. As a result, the flexible conduit bends only to the extent necessary to account for its lateral displacement as the main pivot joint pivots, rather than requiring flexing to also account for vertical movement. The amount of lateral movement is relatively small for up to moderate joint pivoting.

In one arrangement the flexible conduit includes a bendable hose which can bend along most of its length to accommodate change in orientation of its opposite ends. In another arrangement, the flexible conduit includes a primarily rigid pipe with flexible fluid joints at its opposite ends that permit pivoting at each end about at least one axis perpendicular to the length of the pipe.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front elevation view of a portion of an offshore terminal of the prior art.

FIG. 2 is a partially sectional view of a portion of an offshore terminal constructed in accordance with the present invention.

FIG. 3 is a side elevation view of the fluid coupling system of the apparatus of FIG. 2.

FIG. 4 is a partial perspective view of the system of FIG. 3.

FIG. 5 is a plan view of a portion of a flexible coupling system constructed in accordance with another embodiment of the invention.

FIG. 6 is a simplified side elevation view of a flexible coupling system of another embodiment of the invention.

DESCRIPTION OF THE PREFERRED EMBODIMENTS

Figure 7:
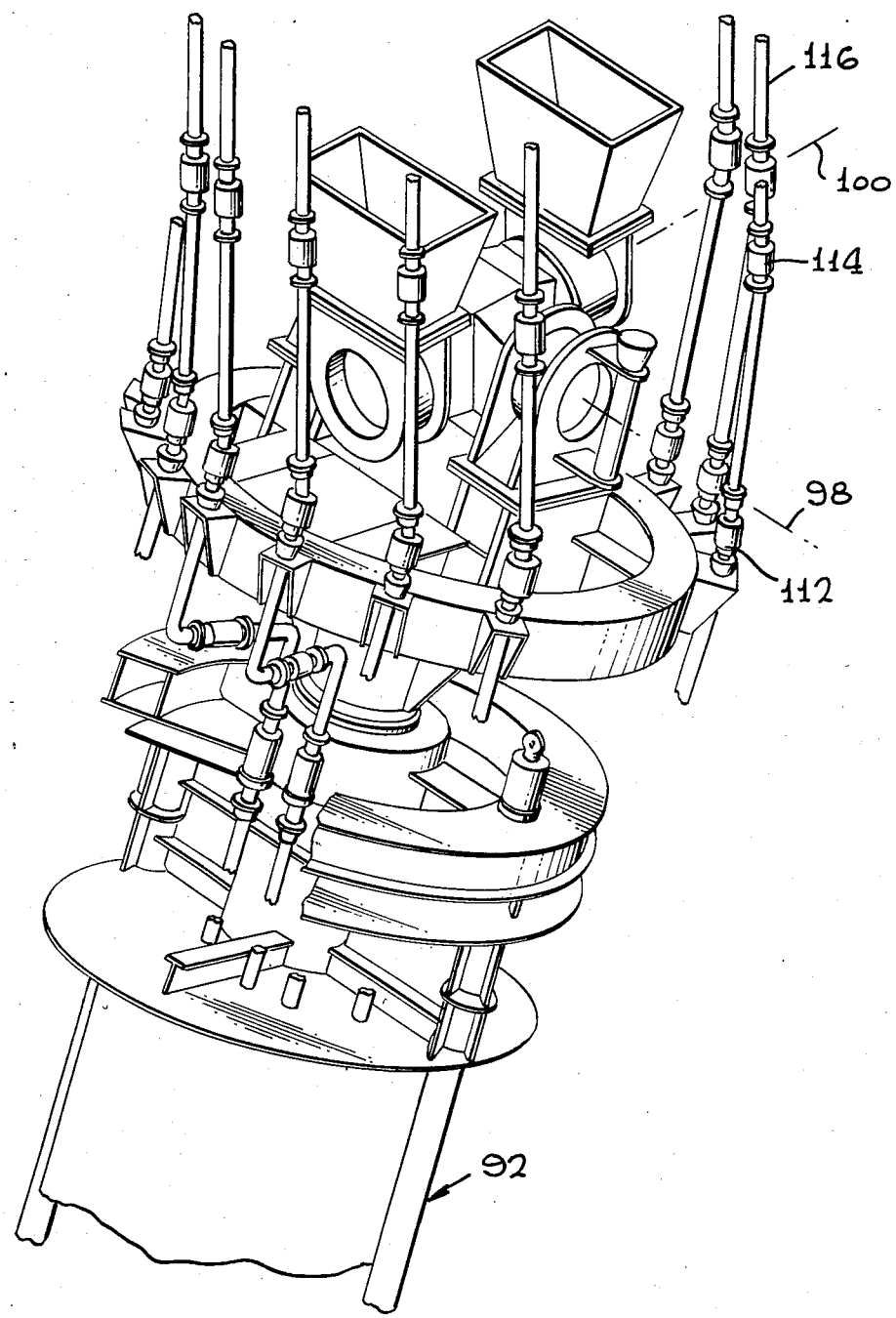
FIG. 7 is a perspective view of the system of FIG. 6.

FIG. 1 illustrates a portion of an offshore terminal 10 of the prior art, which connects a riser type transfer structure 12 to a vessel 14 or other structure that floats at the sea surface. A main pivot joint 16 supports the transfer structure 12 on the vessel, and permits the transfer structure to pivot about two largely horizontal axes 18, 20 with respect to the vessel. A hose 22 carries fluid between the transfer structure and vessel. The hose extends in a loop, in order to accomodate both vertical and horizontal movement of its lower end 24. For example, when the transfer structure pivots to the position 12A, the lower hose end 24 moves to the right and upwardly in FIG. 1, and the hose flexes into the floppy loop 22A. When the transfer structure pivots in the opposite direction, the hose tends to straighten. When the fluid passing through the hose is under high pressure and is moving rapidly, there are considerable loads on the hose, especially in its highly curved configuration at 22A. Such displacements create stresses that tend to reduce the lifetime of the hose. In addition, the considerable loop results in a wide area around the main pivot joint that must be protected.

FIG. 2 illustrates a portion of a system 30 of the present invention, which is here used to couple a transfer structure 32 to a vessel 34, to support the transfer structure on the vessel and to pass fluid between them. The system includes a universal joint or main pivot joint 36 that permits the transfer structure to pivot about two largely horizontal axes 38, 40. The system also includes a means or mechanism 42 for transferring fluid between the upper member at 34 such as the vessel and the lower member 32 such as the transfer structure, by providing a conduit that couples a pipe 44 at the upper member 34 to another pipe 46 at the lower member or transfer structure 32. The pipe 46 is part of a transfer structure conduit 47 (FIG. 3) which includes a loop 49 extending to a pipe 51 at the sea floor. The transfer structure is anchored by at least three chains 53 extending in loose catenary curves to the sea floor.

The transfer mechanism 42 (FIG. 2) includes a flexible middle conduit 48 which can pivot, such as a hose, which has a lower end 50 coupled to the lower conduit or pipe 46, and an upper end 52 coupled to the upper conduit or pipe 44. A coupling means or mechanism 56 serves to couple the upper end of the flexible conduit 48 to the upper pipe 44. The coupling mechanism 56 permits the upper end 52 of the flexible conduit to move up and down. Thus, when the transfer structure pivots from the quiescent position 32 wherein it hangs substantially straight down from the vessel (and/or opposite sides 33 and 35 of the upper and lower members are equally spaced), to an extreme pivoted position 32A wherein it has pivoted by an angle A of 30° from the vertical, the upper end of the flexible conduit can move upwardly to the position 52A. Such upward movement is almost as great as the upward movement of the bottom end of the flexible conduit to the position 50A. Consequently, bending or pivoting of the conduit at 48A need only be sufficient to account for the lateral or horizontal movement of the lower end of the conduit. Even at a 30° bend, the flexible conduit is only moderately flexed. As a result, the area around the main pivot joint that must be protected, is limited, and the small flexing of the conduit results in only small additional sideward stress on it due to high pressure fluid moving at high speed through the conduit.

The coupling mechanism 56 includes an elongated substantially vertical pipe or coupling conduit 60 which can move vertically and which is guided in such vertical movement by a pair of guides 62, 64. The pipe or coupling conduit 60 is biased in an upward direction by a mechanism 72 such as a counterweight 66 coupled through a line 68 that extends over a sheave 70 to the pipe 60. Other biasing devices such as a spring or hydraulic actuator can be used. Another flexible conduit 74 extends in a largely horizontal direction, to couple the top of the vertically moveable pipe 60 to the non-moveable pipe 44 on the vessel. When the transfer structure moves to the position 32A, the vertical pipe moves to the position 60A and the auxiliary flexible conduit 74 moves to the position 7A. The upward biasing mechanism 72 supplies sufficient upward force to support the weight of the pipe 60 and auxiliary flexible conduit 74, and applies additional upward force or biasing to the top of the primary flexible conduit 48 to maintain it in slight tension. This assures that when the transfer structure pivots, the top of the flexible hose will move up.

The system of FIG. 2 is shown as including two primary flexible conduits 48, 76. Each conduit has a corresponding coupling mechanism which enables it to move up and down. In certain offshore terminals, many conduits are necessary for carrying fluids between a pipe at the sea floor and a vessel at the sea surface. FIG. 5 illustrates the top of a transfer structure 80 which includes eight pipes 82. By using a mechanism similar to that of FIG. 2, a relatively neat arrangement of eight largely vertical flexible conduits can be used to pass through the critical area at the level of the main pivot joint.

FIGS. 6 and 7 illustrate another system 90 wherein a transfer structure 92 is coupled to a vessel 94. The transfer structure and vessel are mechanically held together by a main pivot joint 96 which permits pivoting about two largely horizontal axes 98, 100. The system also includes a means or mechanism 102 for transferring fluid between a lower conduit 104 on the transfer structure, to an upper conduit 106 on the vessel. The system of FIG. 6 is largely similar to that of FIG. 2, except that a flexible middle conduit 108 is used which includes a substantially rigid pipe 110 and flexible fluid joints 112, 114 at opposite ends of the rigid pipe. The upper flexible fluid joint 114 is connected to an elongated, substantially vertical pipe or coupling conduit 116 which can move vertically in a guide 118. The upper end of the vertically moveable coupling conduit is connected to the upper conduit 106 through an auxiliary flexible conduit 120 which includes flexible fluid joints 122, 124 at opposite ends of a rigid pipe 126. It is possible to provide a pivot joint along the auxiliary rigid pipe 126, although this is generally unnecessary. The pipes 110, 116 are constructed to withstand compression loading so it is not necessary to bias them upwardly. However, compression loading of the pipes 110, 116 can be reduced by including a device indicated at 128 to upwardly bias the top of pipe 116.

When the transfer structure 92 lies at its quiescent position shown in 92Q, the middle conduit is at the position 108Q. When the transfer structure pivots about axis 98 to the position shown in solid lines in FIG. 6, one coupling conduit 116 moves down, while an opposite coupling conduit 129 at the opposite side of the main pivot joint 96 moves up.

It can be seen that fluid flows substantially only through rigid piping in this embodiment of the invention. The use of substantially only hard piping is often considered to provide greater reliability.

Thus, the invention provides a fluid coupling for carrying a fluid between members lying below and above a pivot joint, which uses a flexible conduit that achieves only a moderate curvature or angles of bending and that is therefore exposed to only moderate loading of fluid passing therethrough, and which always lies within a limited space about the pivot joint. This is achieved by use of a flexible middle conduit with opposite ends coupled to upper and lower pipes, and with at least one end being able to move largely vertically as the members pivot. A coupling mechanism, which couples the upper end of the flexible conduit to a pipe at the upper member, can include a largely vertical pipe which is biased upwardly, and whose upper end is coupled through an auxiliary flexible conduit to a substantially fixed pipe on the upper member. The middle conduit can be a hose formed of flexible material which allows it to bend along most of its length, or a hard pipe conduit formed of rigid material and which is rigid against bending along most of its length but with flexible fluid joints at its ends.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a system which includes a pivoting coupling for connecting a lower member to an upper member and permitting them to pivot about largely horizontal axes, the improvement of means for transferring fluid between a lower member conduit at said lower member to an upper member conduit at said upper member comprising:

a flexible middle conduit having upper and lower end portions and extending in a largely vertical direction and spaced from at least one of said horizontal axes, said upper end portion lying closest to said upper member and said lower end portion lying closest to said lower member;

means for coupling said upper and lower end portions of said flexible middle conduit respectively to said upper and lower member conduits;

means for supporting one of said end portions of said middle conduit in movement in primarily vertical directions with respect to the member it is closest to, whereby to minimize flexing of the middle conduit.

2. The improvement described in claim 1 wherein:

said end portion of said middle conduit which is moveable, is said upper end portion; and said coupling means includes a pipe that is moveable in a largely vertical direction with respect to said upper member and which has a lower end connected to the upper end portion of said middle conduit, and said means for supporting includes means for biasing said pipe in a largely upward vertical direction with sufficient force to apply an upward bias to the upper end portion of said middle conduit.

3. The improvement described in claim 1 wherein:
said members have a quiescent position wherein opposite sides of said members are substantially equally spaced, and said flexible middle conduit extends in substantially a straight line when said members are in their quiescent position.

4. The improvement described in claim 1 wherein:
said middle conduit includes a rigid pipe extending along most of the length of the middle conduit and having opposite ends, and a flexible fluid joint at each of said ends of said rigid pipe, said flexible fluid joints respectively coupled to said upper and lower member conduits.

5. The improvement described in claim 1 wherein:
said middle conduit comprises a hose formed primarily of flexible material and said middle conduit is bendable along most of its length.

6. An offshore terminal apparatus for use in the sea, comprising:
a pipe lying at the sea floor;
a fluid storage structure lying near the sea surface, said structure having an upper pipe and a coupling device coupled to said upper pipe, and said structure having a pivot joint with a joint top and with a joint bottom that can pivot about largely horizontal axes with respect to said joint top, said pivot joint having a quiescent position wherein the joint bottom hangs from the joint top;
a transfer structure anchored to the sea floor, and extending to said pivot joint, said transfer structure having an upper end connected to said joint bottom;
a transfer structure conduit extending from said pipe at the sea floor and to said transfer structure upper end;
a flexible conduit having a lower end connected to the upper end of said transfer structure and in communication with said transfer structure conduit and having an upper end connected to said coupling device;
said coupling device having a coupling conduit with an end which is connected to the upper end of said flexible conduit, and having means for biasing said coupling conduit and the upper end of said flexible conduit upwardly, said upper end of said flexible conduit and said end of said coupling conduit being moveable vertically.

7. The apparatus described in claim 6 wherein:
said coupling conduit of said coupling device comprises an elongated vertically extending pipe, and said coupling device includes at least one guide which guides said vertically-extending pipe in vertical movement.

8. The apparatus described in claim 6 wherein:
said coupling conduit of said coupling device has a second end which is an upper end, and said coupling device includes a pipe with an end primarily horizontally spaced from said upper end of said coupling conduit, and also includes an auxiliary flexible conduit which extends between said upper end of said coupling conduit and said end of said pipe.

9. A method for passing fluid between upper end lower conduits lying respectively at the lower and upper members of a pivot joint, wherein the pivot joint permits the lower member to pivot about a pair of largely horizontal axes with respect to the upper member, comprising:
establishing a flexible conduit which extends in largely a straight line between said lower and upper conduits;
mounting the portion of said upper conduit which is connected to said flexible conduit, so said portion can move up and down; and
urging said upper conduit portion upwardly.

* * * * *